United States Patent Office 3,023,096
Patented Feb. 27, 1962

3,023,096
METHOD FOR KILLING WEEDS
Durward O. Guth, 7828 Sunset Ave., Elmwood Park, Ill.
No Drawing. Filed June 20, 1957, Ser. No. 667,041
1 Claim. (Cl. 71—2.4)

The instant invention relates to methods and compositions for regulating the growth characteristics of plants. More particularly, the instant invention involves methods and compositions for selectively increasing the effect of a plant regulant for one portion of a living plant or the entire plant and/or selectively reducing the effect of the same regulant for another portion of the same living plant, or of another entire plant by control of the movement of translocatable regulants within the plant.

It is well known that certain factors known as auxins are responsible for the growth characteristics, development, and health of plants. Herbicides are substances which destroy plants, especially weeds. Some auxins act as herbicides when applied in abnormally high concentrations. In this specification and the appended claim "plant regulants" is used to include both auxins and herbicides. All the plant regulants referred to herein are translocatable, that is, they migrate within the living plant, and thus are capable of exhibiting their effects on plant organs other than those to which they are initially applied.

Translocatable regulants are used for many purposes, some of the more familiar being plant stimulation, defoliation of plants, weed killing, fruit setting, etc. The manner in which these regulants function in one portion of a living plant is often entirely different from the manner in which they function, or fail to function, in another portion of the plant. For example, a regulant may have no appreciable effect upon the foliage portion of the plant, but may cause additional root sprouts if applied to the roots of the plant. On the other hand, a regulant often affects a portion of a plant that is different from the portion where it is preferable to have the effect of the regulant take place. It is usually most convenient to apply the regulant to the foliage by spraying, and in some cases the action of the regulant on the foliage part is the desired effect. For example, in the case of annual weeds where the killing of the foliage results in effective killing of the entire plant, certain herbicides tend to transport from the foliage and, therefore, the quantity of herbicide required to accomplish the killing is increased over that which would effectively do the job if translocation were inhibited.

However, in other cases it is desirable to cause substantial amounts of the plant regulant to move from the area of application to other parts of the plant, such as the roots. Frequently a large amount of translocatable regulant must be applied in order to achieve adequate translocation to a desired portion of the plant remote from the point of application. In many instances, the part of the plant to which the regulant is applied is killed or injured before enough regulant reaches the desired location of the plant to produce the desired effect, and the death or injury of the part terminates further translocation. For example, application of many of the commonly used herbicides to the foliage of perennial weeds wilts the leaves, thereby terminating translocation of the herbicide therethrough before the herbicide reaches the roots of the plant. In the case of perennial weeds, it is necessary to kill the roots completely if the plant is not to reappear quickly or the following year. When the leaves wilt and are "knocked down" before a lethal dose of the herbicide has translocated from the leaves to the stem and the roots, the weed will not be killed because translocation from the leaves ceases as soon as the leaves are knocked down. If the leaves die too quickly, the concentration of herbicide in the roots will be insufficient.

Herbicidal auxins are presently available as salts, such as the sodium salt, various amine salts such as dimethylamine salt, and various esters in the volatile and low volatile class such as the isopropyl ester and the butoxyethoxypropyl ester, respectively. These regulants have been found to be relatively effective for a number of different weeds, but they are totally ineffective for certain perennial weeds which often cause the greatest amount of trouble. Current herbicides have been unsatisfactory against sturdy plants, such as Canada thistle (*Cirsium arvense*), bur ragweed (*Franseria tomentosa*), Russian knapweed (*Centaurea repens*), tanweed (*Polygonum muhlenbergii*), field bindweed (*Convolulus arvensis*), climbing milkweed (*Gonolobus laevis*), leafy spurge (*Euphorbia esula*), etc.

As an illustration of the difficulty encountered with these weeds, it has been found that an application, for example, at a concentration of 1 lb. per acre of 2,4-dichlorophenoxyacetic acid; known as 2,4-D acid, in the form of the butoxyethoxypropyl ester is very effective for "knocking down" Canada thistle. The roots of the thistle are not killed, however, and considerable regrowth occurs even in the same season; and this concentration of application has been found to be injurious to crops such as oats in the field in which the Canada thistle is located. Comparable results are obtained using about one and one-half (1½) lbs. per acre of the sodium salt of 2,4-D acid. The amine salts of these auxins have been suggested where crop injury results from the use of the esters, but again it is only the foliage of the Canada thistle that is killed and regrowth occurs. Also, the amounts effective to knock down Canada thistle cause crop damage. The term "crops" is used herein in the broadest sense to mean plants which are desired and which are growing in a desired location, which may include field crops such as cereals (oats, wheat, barley, etc.) and legumes as well as horticultural crops.

Some attempts have been made to prevent the knock down of the leaves by spraying the weeds at frequent intervals with small doses of the herbicides in the hope that enough will transport and build up in the roots to kill the plant. However, this approach has been tedious and unsatisfactory.

Although the term "weed" is used herein in the broadest sense to mean a plant which grows where it is not desired, the present invention is particularly useful in connection with perennial plants of the "weed" class having extending root systems, since it is difficult to apply a regulant to the roots of such plants.

Substantial "soil sterilization" may be effected by the use of excessive amounts of a given herbicidal auxin, thereby destroying not only the weeds but also all plant growth in a given soil area. Actually, the only practical course of action in the case of practically all types of crops infected with Canada thistle has involved what amounts to substantial "soil sterilization" if the Canada thistle was actually to be destroyed. The other alternative was a mere attempt at "controlling" the Canada thistle with corresponding loss due to crop damage from the thistle. Even then, the Canada thistle tends to return the next year, because of the extensive root systems there involved, so that the losses through crop damage must be repeated from year to year if the Canada thistle was to be controlled. The instant invention actually is applicable to soil sterilization for reasons which will be discussed hereinafter; but the invention also affords unique advantages in the use of a herbicidal auxin to kill sturdy weeds in certain crops.

The instant invention is based upon the discovery that the characteristic translocation properties and the overall effect of plant regulants can be altered by the presence of an alkali metal from the group consisting of potassium and lithium. Sodium salts of plant regulants have been widely used and it has been assumed in the art that all of the alkali metal compounds would behave in equivalent manner. However, I have found that the presence of lithium in the regulant inhibits translocation of the regulant and concentrates the action of the regulant at the area of application. On the other hand, I have found that potassium travels in the fluid of the plant and acts as an escort agent for plant regulants causing rapid translocation from the area of application, for example, to the roots. The potassium can be taken up from the ground or nutrient media by the roots and transmitted to the foliage. It has also been found that when applied to foliage, it travels in the reverse direction, to the roots, and will appear in the nutrient media or soil. The potassium concentration at any portion of the plant is a result of complex equilibria which may be changed to cause migration of the potassium. In the instant invention, this nomadic nature uniquely possessed by potassium is used to accelerate the translocation of regulants from one location in the plant to another and to modify the effect of known regulants. In the practice of the instant invention, a herbicide containing potassium can be used to spray not only a growth of weeds, but fields of crops containing weeds, because the action of the herbicide is altered so that the crops will not be damaged.

It is, therefore, an important object of the instant invention to provide an improved method and compositions for the regulation of the growth of plants.

Another object of the instant invention is to provide a method for accelerating translocation of a plant regulant from one location to a second location remote from the first in a plant, and a composition for accomplishing this.

Still another object of the instant invention is to provide a method of killing weeds in a field of crops which consists in treating the field with a concentration of herbicidal auxin sufficient to kill the weeds and also sufficient per se to damage the crops, plus the potassium ion in amount sufficient to prevent the auxin from damaging the crops.

It is a further object of the instant invention to provide herbicidal compositions which when sprayed onto perennial weeds translocate to the roots before the foliage is killed so that the entire plant is killed.

It is another object of the instant invention to provide a method of minimizing translocation of a plant regulant from the area of application and compositions for accomplishing this which contain the regulant and the lithium ion.

These and other objects of the present invention will become apparent to those skilled in the art from the following detailed description thereof.

In its broadest aspects, the instant invention relates to regulation of plant growth by application of a regulant, the action of which is modified in order to accomplish the desired effect on the particular plant.

In one embodiment of the invention, plant growth is regulated by translocating a regulant from a first location to a second location in the plant and remote from the first, which comprises applying the regulant to the first location in the presence of the potassium ion.

As an illustration, when a composition comprising an herbicidal auxin in the presence of the potassium ion, either, in a water-soluble potassium salt or in the potassium salt of the auxin, is applied to the foliage portion of a weed in a field of cereal crops, the effect of the auxin is the killing of the roots of the weed without damage to the crop.

The unique character of the invention may be appreciated when one considers that concentrations in excess of about ½ lb. per acre could ordinarily not be used heretofore on crops (particularly cereal crops) infested with weeds without causing damage to the crops, when using commercially available herbicidal auxins such as the amides, esters, or sodium salts of auxins such as 2,4,5 - trichlorophenoxyacetic acid, known as 2,4,5-T; 2,3,6-trichlorobenzoic acid, known as 2,3,6-TBA; 2,4-dichlorophenoxyacetic acid, known as 2,4-D; 2-methyl-4-chlorophenoxyacetic acid, known as MCP; and the like. In contrast, as much as 32 lbs. per acre of potassium 2-methyl-4-chlorophenoxyacetate may be used without causing damage to crops. In this case, the potassium 2-methyl-4-chlorophenoxyacetate is used in the substantial absence of other herbicidal auxins, and this increased concentration of the auxin will result in more extensive and thorough weed killing because of the greater amount of the methylchlorophenoxyacetyl radical present.

Compositions other than a potassium salt of the auxin may be used. For example, an auxin such as MCP is used in combination with a potassium salt that is substantially inert (although water soluble) or in combination with a potassium salt of another auxin, as illustrated by a composition containing ½ mol of potassium methylchlorophenoxyacetate and ½ mol of the ester of methylchlorophenoxyacetate. This admixture can be applied to a field of crops infested with weeds, in concentrations of 1 to 5 lbs. per acre, without causing appreciable crop damage. The same is true if the potassium methylchlorophenoxyacetate is replaced by a molar equivalent of potassium carbonate, potassium acetate or some other water-soluble potassium salt. In other words, if the potassium is present in at least the molar equivalent of another auxin or the only auxin employed, then it is possible to use concentrations in the neighborhood of about 1 to about 5 lbs. per acre on a field of crops. Of course, more than the molar equivalent amount of potassium may be employed to increase the rate of translocation. Generally, not more than about 5 molar equivalents will be employed. On the above basis, from about 2 to about 10 times as much herbicidal auxin may be used in a composition (with at least a molar equivalent of potassium present) as could be used in the absence of the potassium without causing crop damage.

These spectacular results cannot be explained in full because of the complexity of plant growth phenomena. A theory, by which it is not desired to be limited, but which serves to explain at least in part the instant invention, is that the plant system involves an aqueous fluid medium throughout the entire plant from the tips of the roots to the tips of the leaves. In general, flow of materials in this fluid medium is upward in that the roots draw nourishment from the ground and feed this nourishment to the stem and leaves whereat growth of cells take place. In the case of sodium dichlorophenoxyacetate or sodium methylchlorophenoxyacetate, the auxin apparently is absorbed by the leaves and stem which come into contact therewith, and it effects destruction of these portions of the plant which it contacts. Apparently, the concentration of the sodium salt is slowly translocated from the portion of the plant which originally contacts the sodium salt and absorbs the same; and if this concentration is sufficient to effect the kill of the foliage, the knock down of the weed results. The effect of this is to cause the plane stem and leaves to wilt, while the roots are not apparently affected in any way because the translocation ceases when the foliage dies. The rate of killing or destructive effect in a given portion of the plant is dependent upon the concentration of the herbicide thereat. In the case of the instant invention where the potassium ion is applied to the weed foliage with the auxin, it appears that this combination of materials rapidly enters into the fluid stream in the plant and distributes itself substantially uniformly throughout the entire body of the plant including the leaves and stem as well as the roots. The distribution of the auxin may not necessarily be uniform throughout the entire plant, but a distribution in response to certain equilibrium phenomena is effected. This effects a dilution of the auxin at its site of introduction, instead of a concentration thereof at said site. The net result is a slightly slower but much more complete and effective kill in that the roots of the weed are also killed.

The effect of diluting the overall concentration of the potassium salt of the auxin in the leaves and increasing the concentration in the roots apparently increases the selective action of the herbicidal auxin on the weed and reduces the tendency for this auxin to cause damage to the crops.

The potassium is responsible for this migration of the auxin. When other alkali metals or the ammonium radical are present, there is little or no tendency to distribute the auxin throughout the plant to its roots. The potassium ion is unique in its particular function. The results speak for themselves, and the plant roots are actually killed. In fact, by using rather substantial concentrations of the potassium auxin (which may be either the potassium salt of the auxin or an auxin plus a water-soluble potassium salt), it is possible to kill the so-called "dormant" root particles buried in the soil, presumably by having the potassium-guided auxin pass through the system of the growing plant into the roots and into the soil and then be absorbed with the soil nutrients by a dormant root portion. The potassium thus effects substantially a reversal of flow in the aqueous system in the plant in that the potassium-guided auxin flows downwardly toward the roots in establishing a suitable potassium equilibrium throughout the entire plant. Whether the potassium flows in the system merely as an ion, or as a potassium compound, has not been determined. In the description and claims, the potassium will be designated as the ion. However, the instant invention does not depend upon the theory that potassium acts as the escort agent in the form of the ion rather than in some other form.

As a demonstration of the effectiveness of the instant invention for the control of Canada thistle in an oats crop (wherein about 5% to 25% of the plants in the field were Canada thistle and the remainder oats), a composition is prepared as follows:

4 lbs. 2-methyl-4-chlorophenoxyacetic acid (MCP)
1 lb. potassium ion (from potassium hydroxide)
0.6 lb. ethylene diamine tetraacetic acid are dissolved in a sufficient amount of water of approximately 15 grains hardness to make 50 gallons of solution This solution is then applied uniformly by spraying over one acre of land. If this concentration of the sodium salt of the auxin, that is, sodium 2-methyl-4-chlorophenoxyacetate, were applied, very serious damage would be done to the oats crop. In contrast, the potassium in the above solution protects the oats from any injury. Although the Canada thistle may not die out completely in less than about one month, it is, however, a lethal dosage for the Canada thistle in that no regrowth during the next season results.

A more concentrated composition can be used for more rapid killing, that is, as much as 16 lbs. of the potassium 2-methyl-4-chlorophenoxyacetic acid can be applied to an acre of oats containing weeds without causing injury to the oats crop.

In the foregoing composition (i.e., the 50 gallon solution), the pH was adjusted to about 8.0. In the preferred practice of the invention, the pH is adjusted by adding potassium hydroxide and ethylene diamine tetraacetic acid in order to maintain the pH between about 7.0 and about 8.0.

Although it is often preferable to employ only potassium salts in the instant composition, or to have only potassium cations present in the solution, so that the potassium can carry out its function with a minimum of interference from any side reactions, it may also be desirable in certain instances to employ certain other derivatives such as the ester of the dichloromethylchlorophenoxyacetic acid, or other herbicides. Thus, in situations where the weed is not particularly sturdy and the crop is relatively sturdy, it may be desirable to accelerate the actual knock down of the weed. In any event, this acceleration should not be such that the potassium is appreciably hindered in its migration function so that the potassium would be unable to translocate the herbicide, or a sufficient portion thereof, to the roots for killing purposes. The particular advantage of employing a composition wherein only the potassium cation is present, or a composition which does not have present any herbicide derivative other than the potassium salt, is that relatively larger dosages of the active herbicide ingredient may be employed without causing damage to the crops while making a much more complete and effective kill of sturdy weeds. As will be appreciated, all herbicides function in a generally selective manner in that they are more effective in killing a given weed than they are in killing a desired plant or crop from which the weed is to be removed. The difficulty is that an amount of herbicide sufficient to effectively kill a weed may also be sufficient to cause substantial or complete damage to the crop. By the use of potassium methylchlorophenoxyacetate (or compositions such as that specified herein) in the substantial absence of other herbicides, it is possible to greatly exaggerate the difference between the killing effect upon the weed and the killing effect upon the crop.

A chelating agent such as ethylene diamine tetraacetic acid is preferably incorporated into the composition. The reason for this is that it is preferable to use tap or hard water in the practice of the instant invention. Artificially soft or softened water contains a rather substantial number of sodium ions therein because of the usual softening process and the sodium ions are not helpful in the practice of the instant invention. Hard water is also more economical to use. The chelating compound is incorporated in the instant composition preferably in amounts ranging from 1½ or 2 to as much as perhaps 50 times the amount necessary to take care of the hardness in the water or, expressed in other terms, the chelating agent may be present in amounts ranging from 0.05 mol to about 1 mol per mol of the methylchlorophenoxyacetyl radical in the above mentioned solution. The chelating agent, which may also be a buffer, functions to prevent substantial alteration of the composition by the hardness in the water, tending to change the pH or tending to form insoluble compounds with the methylchlorophenoxyacetic acid present. Chelating compounds are well known in the art, and a typical example in the above composition is also used to form the buffer.

In order to fully illustrate the instant invention and show the wide scope of its application, but with no intent to be limited thereto, specific examples are given.

*Example I*

Canada thistle has been effectively set back using an aqueous solution containing as little as 5 ozs. of MCP acid per acre in conjunction with potassium so that the Canada thistle buds do not interfere with the crop, consisting of young pea plants. The fields were sprayed, including the young pea plants, at the time the peas were in a growth stage averaging 5 to 7 nodes. The peas were not damaged.

*Example II*

Canada thistle in a non-cultivated area where the root systems are not torn apart have been killed by a single post emergence application of an aqueous solution of MCP containing potassium. When applied at the rate of 2 lbs. per acre, regrowth of the weeds did not take place in five years.

Canada thistle in cultivated areas where the root systems have been torn apart have been completely killed in two post emergence applications of MCP containing potassium applied at the rate of 2 lbs. per acre.

Example III

Russian knapweed in a pasture of brome grass and crested wheat grass has been killed by a single post emergence application of 32 lbs. per acre of MCP acid with potassium in aqueous solution. The brome grass and crested wheat grass were not inured and went on to bloom and produce seed in the normal manner. No regrowth from the roots of the Russian knapweed had taken place for 16 months from the date of spraying.

Example IV

Leafy spurge has the trait of producing many sprouts from the root system during late summer and fall that stop just short of the surface of the ground and are ready to emerge early in the spring. This extremely early growth gives leafy spurge a great advantage over most crops. By the use of 4 lbs. per acre of 2,3,6-trichlorobenzoic acid in aqueous solution containing potassium ion as a post emergence spray, this characteristic sprouting from the roots has been inhibited.

Example V

The following composition was prepared:

0.5 lb. 2-methyl-4-chlorophenoxyacetic acid
0.097 lb. potassium (from potassium hydroxide) dissolved in 15 gallons of water This was applied uniformly over one acre of an oat crop containing 1% to 20% weed infestation of wild buck wheat. The oats were unaffected, but the wild buck wheat was killed.

It will be noted that wild buck wheat is not a perennial but it represents a type of sturdy weed which requires such high concentrations of ordinary herbicides that crop damage almost invariably results.

Example VI

An acre of winter wheat containing an infestation of field bindweed was sprayed with 50 gallons of a solution containing 1 lb. of 2-methyl-4-chlorophenoxyacetic acid, 0.45 lb. of potassium (from potassium hydroxide), 0.65 lb. of ethylene diamine tetraacetic acid. The winter wheat was not injured, yielding a normal crop, while the field bindweed was controlled.

Example VII

Two compositions containing 2,4-D were prepared:

2 lbs. 2,4-dichlorophenoxyacetic acid
0.6 lb. potassium (from potassium hydroxide)
0.3 lb. ethylene diamine tetraacetic acid in sufficient water of 15 grains hardness to make 50 gallons of solution and 0.5 lb. sodium 2,4-dichlorophenoxyacetate
2 lbs. potassium acetate in sufficient water of 15 grains hardness to make 50 gallons of solution Each of these compositions was adjusted to a pH of about 7.0 and sprayed on an acre of oats containing Canada thistle. The weed was permanently eliminated.

The use of potassium in conjunction with the herbicides in the above examples slows down the effect of the herbicides on the vegetative portion of the plant and permits the use of higher rates of application before knock down occurs. Because of this characteristic, desired crops such as the cereals, oats, wheat and barley, and grasses such as brome, crested wheat and the like, which are relatively tolerant to herbicides such as 2,4-D and MCP acid, it is possible to use higher rates of application and to apply over a greater range of growth stages and environmental conditions than when these same herbicides are used without potassium.

I have not been able to obtain comparable results by the use, instead of potassium, of any of the other alkali metal ions such as sodium or ammonium or by using amines or nitrogen-containing compounds which are frequently considered similar chemically to the alkali metals. Potassium has special characteristic that enable it to act as escort agent in combination with the biological regulants according to the concept of my invention.

In like manner, potassium is used with various other plant regulants, such as plant growth stimulants, plant hormones, and the like. In general, plant regulants are aliphatic monocarboxylic acids having a carbon atom linked to a nuclear halogenated aromatic ring through a strongly negative, polyvalent, non-metallic atom (e.g., oxygen or sulfur). This class of compounds is recognized in the art and disclosed in patents such as Lontz Reissue Patent No. 23,115 and others.

In another embodiment of the invention, the activity of the regulant is enhanced at the area of application by use of the lithium ion with the auxin. For example, when used as an application to the foliage such as in a post emergence spray, the effect of the auxin on the vegetative portion is emphasized. Therefore, when the weed to be killed is not in a field of crops, or where killing of the foliage effectively controls the weed, the use of lithium in herbicides is especially advantageous.

It will be appreciated that the action of any given plant auxin can now be tailored for the plant and the circumstances of use. As an example of the embodiment of the invention wherein the translocation characteristics are inhibited, a composition was prepared from 227 grams of 2,4-D and 43.5 grams of lithium hydroxide monohydrate. These two compounds are mixed dry, and about 100 milliliters of water are added to produce a paste. The paste is heated to between 70° C. and 85° C. with stirring until a clear liquid is obtained. This clear liquid may be diluted directly or at any time prior to use with water to form 10 gallons of spray. If desired, flakes can be obtained from the liquid, for example, by drying a thin layer of the composition on the surface of a revolving drum-type dryer. The solidified material is scraped off the sides to obtain flakes. These flakes are stable, easily handled, and readily soluble in water. The resulting solution has a pH of about 6.0.

Use of the lithium-containing compositions are not limited to spray applications to the vegetation or the soil, but they may be applied by other well known means and may be incorporated into plant regulants other than for herbicidal purposes when it is desired to localize the action of the biological agent in the area of the application.

Compositions other than the lithium salt of the plant regulant can also be used. For example, the ester, amine or sodium salt of a conventional regulant is used in combination with a water-soluble lithium salt or in combination with the lithium salt of another regulant. Translocation of the conventional compound is thereby inhibited.

Instead of lithium hydroxide other water-soluble lithium salts, such as lithium carbonate and the like, may be employed; for example, the following were combined:

227 grams of TBA acid
40 grams of lithium carbonate

The two ingredients are mixed dry and about 100 milliliters of water are added to produce a paste. The paste is heated to about 70° C. to 85° C. with stirring. Carbon dioxide is evolved by the reaction, and upon completion of the reaction, a clear liquid is obtained. Flakes can be produced as described above, or the liquid may be sold as a concentrate or diluted with about 10 gallons of water and sold as a ready-to-use solution. When this is applied uniformly as a spray over ⅛ acre of land, which is at the rate of 4 lbs. per acre of TBA acid, it is a very effective herbicide for smartweed such as *Persicaria pennsylvanica* and *Polygonum muhlenbergii*.

If desired, the ingredients of the instant compositions may be mixed dry and handled before the reaction is induced. For example, 227 grams of 90% 4-chlorotoluoxyacetic acid and 53 grams of lithium carbonate are mixed. This mixture contains about 75% by weight of the acid and can be transported dry to the point of use. Before use about 9 gallons of water are mixed with the dry mixture, and it is stirred until dissolved. The 9 gallons of solution, when applied to 9/10 acre of land, provides an application rate of ½ lb. of the chlorotoluoxyacetic acid per acre. It is suitable to kill weeds, such as wild mustard (*Brassica arvensis*) in a cereal crop such as oats.

The lithium salt of auxins has substantial advantages compared to most of the presently available herbicides, such as esters and sodium salts of auxins. Unlike the sodium salts of auxins, for example, of 2,4-D which is very difficult to dissolve in water and which will not remain in solution without the aid of dispersing agents, even in concentrations as low as about 0.2 lb. per gallon, the lithium salt of 2,4-D can easily be dissolved in a solution containing a concentration of 2 lbs. per gallon. In addition, as a foliar or post emergence spray, the lithium compositions produce greater activity on the vegetative portion of the plant than conventional biological agents. The instant compositions are of low volatility and do not boil off after application to drift to adjoining plants and cause undesired effects.

In summary, the instant invention provides a method for controlling and altering the translocation properties of plant regulants so that the major action of the regulant occurs in the desired part of the plant.

When it is desired to decrease the effect of a regulant on the vegetative portion of a plant when applied thereto, and to increase its effect on the entire plant or the roots, potassium is used in conjunction with the regulant. The potassium may be present either as the salt of the regulant or, if another derivative of the regulant is employed, as a water-soluble salt. The potassium concentration is at least equal to the number of mols of the regulant.

When the desired effect of the plant regulant is in the area of application and translocation is to be minimized, lithium is used in conjunction with the regulant either in the form of the lithium salt of the regulant or, if the acid or another derivative of the regulant is employed, as a water-soluble lithium salt.

The instant invention makes it possible to tailor the properties of plant regulants for maximum effectiveness for a particular purpose. In addition, by altering the usual translocation properties of many auxins with potassium, they can be used for purposes for which they were previously impractical or useless because of their perverse translocation properties. For example, generally 2,4-D and MCP could not be used for killing weeds when they were growing in a field of crops because, when sufficient of these auxins were used to kill the weeds, they would also kill the crops. However, compounds of 2,4-D and MCP and similar compounds containing potassium, as herein described, can be used to kill extremely sturdy weeds, such as Canada thistle, in fields of crops such as the cereals without harm to the crops. In addition, by increasing the translocation properties of these auxins, it is possible to kill the roots of perennial weeds so that they do not reappear in following seasons.

Although the method for control of translocation properties has been described in great detail relative to herbicidal auxins, the translocation characteristics of other regulants that affect plant metabolism, rate of growth, type of growth, assay, resistance to insects, and the like, are also controlled by practice of the instant invention. The effect of the regulant need not be limited hereafter to the natural effect inherent in the regulant by itself, and frequently a different overall effect can be obtained by altering the translocation properties.

Having thus fully described and illustrated the instant invention, what is desired to be protected by Letters Patent is:

The method of increasing translocation for the control of weeds of the kind exemplified by Canada thistle, bur ragweed, Russian knapweed, smartweed, field bindweed, climbing milkweed, leafy spurge and wild buckwheat to thereby kill the roots of said weeds from application to the foliage which consists of applying to said weeds an aqueous solution containing 2-methyl-4-chlorophenoxyacetic acid sufficient to kill the roots of said plant, and ionizable potassium compound in molar amount more than one and less than about five times the molar amount of said 2-methyl-4-chlorophenoxyacetic acid, whereby said treatment accelerates the translocation of said herbicide through the living sturdy weeds, said aqueous composition being applied to said field to supply at least 5 ounces, but not more than about 32 pounds, of said acid per acre.

References Cited in the file of this patent

UNITED STATES PATENTS

| | | |
|---|---|---|
| 2,394,916 | Jones | Feb. 12, 1946 |
| 2,396,513 | Jones | Mar. 12, 1946 |
| 2,606,830 | Kamlet et al. | Aug. 12, 1952 |
| 2,651,568 | Leblon | Sept. 8, 1953 |
| 2,749,229 | Ligett et al. | June 5, 1956 |
| 2,833,639 | Barrons et al. | May 6, 1958 |

OTHER REFERENCES

Heath et al., in "Nature," vol. 177, #4520, June 16, 1956, pages 1118–1121.